July 20, 1965 M. L. CRIPE 3,195,309
BRAKE MECHANISM
Filed March 8, 1963 2 Sheets-Sheet 1

INVENTOR.
MAXWELL L. CRIPE.
BY
ATTORNEY.

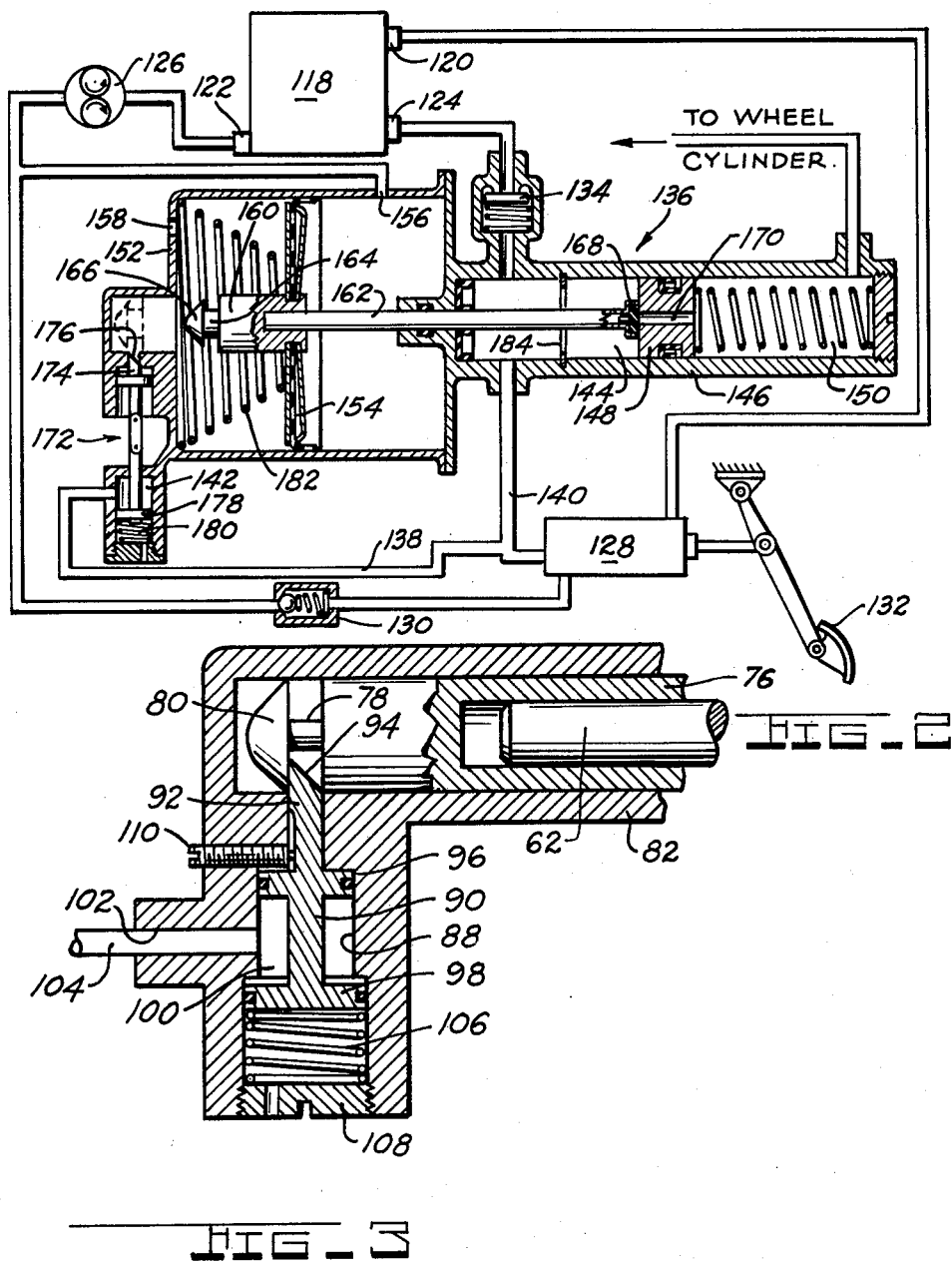

3,195,309
BRAKE MECHANISM
Maxwell L. Cripe, South Bend, Ind., assignor to The Bendix Corporation, South Bend, Ind., a corporation of Delaware
Filed Mar. 8, 1963, Ser. No. 263,933
4 Claims. (Cl. 60—54.5)

This invention relates to a device for a power brake system to reduce the effect of worn brake shoes during manual brake application. More particularly, my device is concerned with reducing displacement necessary for brake application manually.

As brake shoes become worn from repeated use over a period of time, the displacement necessary to bring the shoes into contact with the brake drum increases. With a power brake system the large amount of travel available to the power unit compensates for such wear problems. However, in the event of power failure and worn shoes a driver is suddenly confronted with a large travel of the brake pedal before experiencing any vehicle deceleration. Such a problem can usually be remedied by pumping the brake pedal several times to increase the fluid within the system beyond the manually operated pressure intensifying means. This, as is readily obvious, increases the response time, and is something which must be remembered. It is the principal object of this invention to provide a device which will automatically pump the system up in the event of power failure with worn shoes.

Another object of my invention is to provide a device normally restrained by an operating power brake system which is released by failure of the power brake system to displace a piston causing pressurization of a fluid on one side of the piston and a cavitation on the other to draw a fluid from a reservoir to take up the displacement automatically.

A further object of my invention is to provide a displacement take-up device, as aforementioned, which is held inoperative until a brake application is demanded by an operator.

Still further objects and advantages can be seen in the following description of the drawings in which:

FIGURE 2 is another schematic system presentation with a sectional device in accordance with my invention as applied to a different type of power system than that of FIGURE 1; and FIGURE 3 is an enlarged sectioned view of a latching mechanism such as is found in FIGURE 1.

Figure 1:
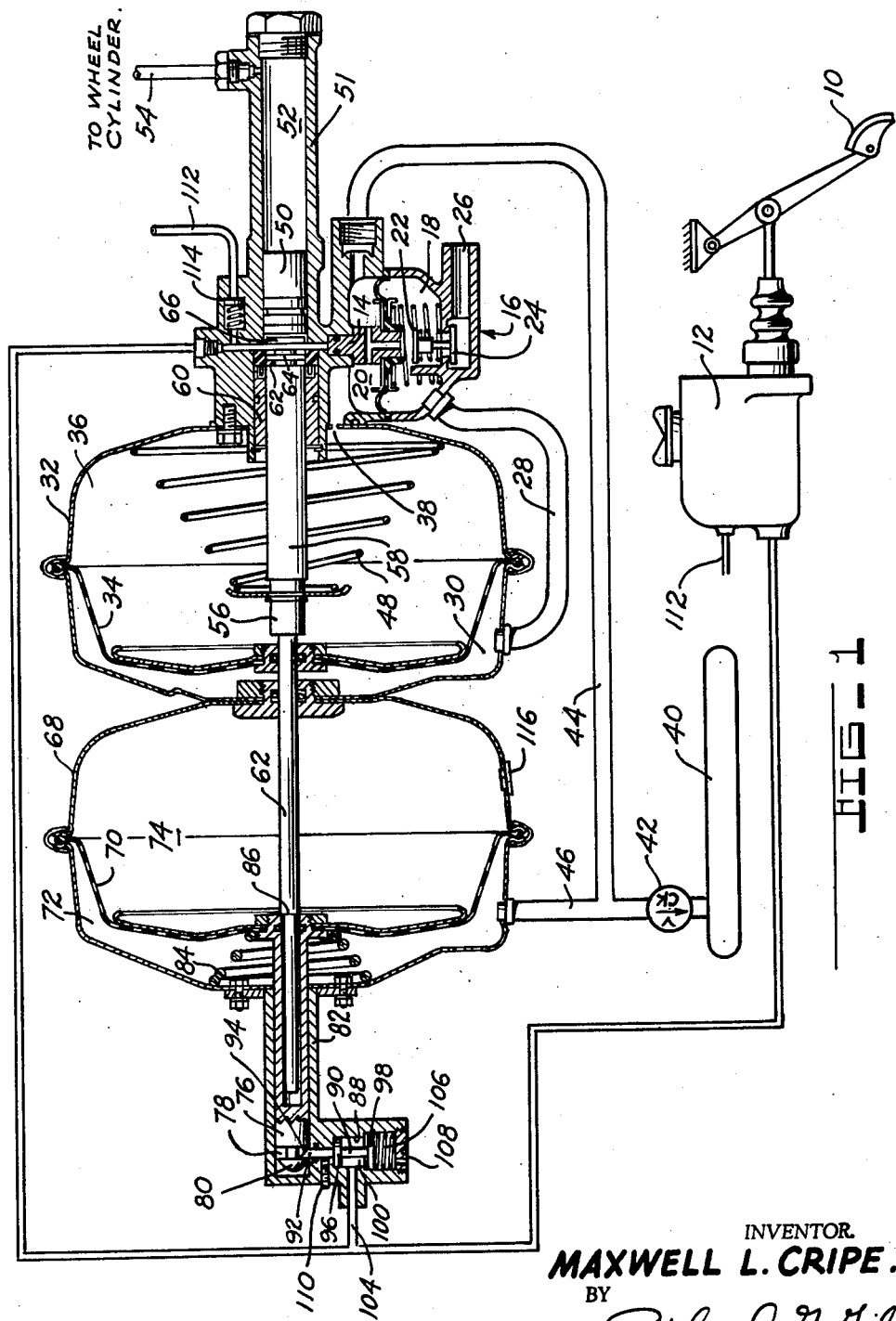
FIGURE 1 is a schematic system presentation showing a device in accordance with my invention in sectional form.

In more detail, in FIGURE 1 I show a brake pedal 10 operatively connected to a master cylinder 12 to pressurize a fluid and force the piston 14 of a power brake control valve 16 to close communication of chambers 18 and 20. By further movement of pedal 10, the piston 14, after sealing with poppet 22, will force poppet 24 to unseat and communicate an atmospheric port 26 with chamber 18.

When port 26 and chamber 18 are communicated, as above, atmospheric pressure is communicated by conduit 28 to chamber 30 within a housing 32. As seen, a movable wall or diaphragm 34 separates the housing into two variable volume chambers 30 and 36. Chamber 36 is communicated at all times to chamber 20 of valve 16 by way of a passage 38, which chamber 20 is open to an intake manifold of a vehicle engine (not shown) via a check valve 42 and conduits 44 and 46.

Normally, the valve 16 is in the attitude shown by FIGURE 1 where chambers 18, 20, 30 and 36 are vacuum suspended. When, however, the piston 14 is moved, as above, atmosphere directed to chambers 18 and 30 causes diaphragm 34 to abut on a tubular shaft 56 which in turn abuts against a tubular shaft 58 to compress a spring 48. A piston 50 integral with a shaft 62 is mounted within a chamber 52 in a housing 51, which housing also receives shaft 58 in a bearing support 60 behind said piston. The shaft or force transmitting rod 62 has a radial flange 64 and is affixed to piston 50 by a pin 66 and slidably mounted within shaft 56. Thus, as the diaphragm 34 moves to compress spring 48 shafts 56 and 58 are forced to move shaft 62 by abutment with flange 64 to force pin 66 to translate piston 50 in chamber 52 and transmit pressurized fluid via conduit 54 to wheel cylinders (not shown) of a vehicle braking system. As one skilled in the art may readily expect, I provide a bleed orifice (not shown) in piston 50 to replenish chamber 52 as required. This orifice is normally open when the piston is to the rear of chamber 52, as shown.

In the event of a power failure, and in cases of power failure and/or with worn shoes, the fluid in chamber 52 may not be sufficiently pressurized until pedal 10 has almost reached runout. This would require pumping to insure adequate braking. However, in cases where the driver does not realize the situation until too late to pump the pressure up, he quite often cannot stop in time. Therefore, I have attached a housing 68 to housing 32, and as in the latter housing I have provided a movable wall 70 within housing 68 dividing it into two variable volume chambers 72 and 74. The movable wall or diaphragm 70 is provided with a stub shaft 76 having a recessed portion 78 with a conically shaped end to provide ramp surfaces 80. The stub shaft is slidably mounted in a bore of a member 82 bolted to the housing 68. A spring 84 is placed in chamber 72 to bias the movable wall 70 to the right, as viewed in FIGURE 1, and the shaft 62 has a shoulder 86 for abutment with said movable wall. The shaft 62 is, as seen, of lesser diameter to the left of the shoulder to be slidably received by the stub shaft 76 connected to the diaphragm.

The member 82 is provided with a bore 88 slidably mounting a pawl mechanism 90 having an upwardly extending finger 92 with an angled face 94. The pawl mechanism is provided with radial flanges 96 and 98 inclosing a chamber 100 (see FIGURE 3). Between the flanges the bore 88 is drilled, as at 102, to form an inlet to chamber 100, and a conduit 104 is connected to the inlet to communicate pressure from the master cylinder 12 to chamber 100. A spring 106 is compressed between flange 98 and an end plug 108 closing bore 88, and a set screw 110 is threaded through member 82 to engage the finger 92. The spring and set screw provide adjustable resistance for operation of the pawl mechanism.

The reservoir of the master cylinder 12 is connected by a conduit 112 to the area behind piston 50 in chamber 52 via a check valve 114 so that reservoir fluid may be drawn into this area as hereinafter explained. In addition, chamber 72 is connected by conduit 46 to the engine intake manifold via the check valve 42.

In operation, nothing will happen in housing 68 as long as vacuum is available in intake manifold 40 and the brakes have not been applied by pedal 10. As soon as pedal 10 is stroked finger 92 is forced down to be removed from recess 78, but as vacuum is available in chamber 72 and atmosphere is in chamber 74, due to an atmosphere opening 116, diaphragm 70 remains, as seen in FIGURE 1. If, however, vacuum is lost spring 84 will force the wall 70 and, in turn, the shaft 62 by abutment on shoulder 86 to move piston 50 to the right to create a void behind the piston which draws fluid past valve 114 from the master cylinder reservoir. As the piston 50 moves to the right fluid is transmitted to the wheel cylinders as before to expand brake means (not shown) into engagement with a brake surface (not shown). Thus, further force on pedal 10 will increase braking pressure at a lesser amount of pedal travel than heretofore available without my pumping means.

As for FIGURE 2, I show another embodiment for my invention, i.e., in a full hydraulic power brake system. In more detail, I show a hydraulic fluid reservoir having a return port 120 and two supply ports 122 and 124. From port 122 I draw the fluid, as by a pump 126, driven by a vehicle engine to supply a power brake valve means 128 via a check valve 130 which check valve permits manual brake application by a pedal 132 in that the brake system is closed from the pump or power system. The reservoir supply port 124 is connected to a check valve 134.

From the power brake valve means pressurized fluid is communicated to a pumping mechanism 136 in accordance with my invention. More particularly, pressurized fluid from valve 128 is fed via conduits 138 and 140 to a pair of chambers 142 and 144. The last mentioned chamber is defined by a housing 146 and a spring piston 148, which piston 148 also forms a variable volume chamber 150 within the housing.

The housing 146 is enlarged to form a large diameter cylinder 152 within which a wall or piston 154 is slidably mounted. To the right of the wall fluid from the pump 126 is introduced, as through port 156; whereas, the area to the left of the wall is open to atmosphere as at 158. The wall is provided with a central portion 160 which projects to the left, as seen in FIGURE 2, and on the right end is adapted to slidably receive a force transmitting rod 162. The portion 160 is formed on its left end or the end opposite that receiving rod 162 with a recess 164 and a terminal portion in having a cone shaped surface 166.

The force transmitting rod is sealingly supported by cylinder 152 and housing 146 to project into chamber 144 and abuttingly contact piston 148. The rod carries a seal member 168 which is aligned with an opening 170 through piston 148 leading a chamber 150, and as long as rod 162 and piston 148 are contacting each other chambers 144 and 150 are sealed from each other, but when piston 148 moves away from seal 168 the chambers 144 and 150 are in communication.

I also provide a latch mechanism 172 comprising a finger 174 having an angled face 176 operated by a spring biased piston 178 within chamber 142, which piston due to a spring 180, in absence of pressure in chamber 142, normally urges finger 174 to project into recess 164 to hold the piston 154 to the rear of cylinder 152.

By way of describing the operation of my device depicted by FIGURE 2, an operator would depress pedal 132 to normally schedule power braking. However, if for some reason, such as pump failure, the depressing of pedal 132 would cause a pressurized fluid to force check valve 134 to close off the power supply system from the brake valve 128 and, thus, send the pressurized fluid to chambers 142 and 144. In chamber 142 piston 178 will then move to the position shown to retract the finger 174 as shown. This releases piston 154 and as no power pressurized fluid is entering inlet 156, a spring 182 causes piston 154 to move to the right projecting rod 162 further into chamber 154 to move piston 148 from a stop 184 creating a void in chamber 144. This void is filled by fluid from reservoir 118 flowing, as by gravity flow through valve 134. Therefore, worn shoe displacement is automatically taken up and further depression of pedal 132 will tightly engage brake means with their respective brake surfaces.

The particular embodiments of my invention described herein show complete systems and subfeatures thereof, but should be considered only as illustrative examples and not as any limitation on my invention as defined in the accompanying claims.

I claim:
1. In a brake system a means to automatically increase fluid displacement as is normally attended with pumping of a brake pedal by a vehicle operator, which means comprises:
   a power brake control means operatively connected to the brake pedal;
   a hydraulic fluid reservoir in communication with said power brake control means;
   a fluid pressure intensifying means including a housing having a bore therein within which a piston is operatively arranged to divide said bore into a first variable volume chamber and a second variable volume chamber, which housing is provided with a discharge port for said first variable volume chamber and a valve port and an inlet port for said second variable volume chamber;
   conduit means connecting said discharge port to said brake system, said valve port to said hydraulic fluid reservoir and said inlet port to said power brake control means;
   a force transmitting rod operatively connected to said piston;
   a fluid pressure servometer having a housing with a movable wall therein, said housing having a fluid inlet communicating one side of the movable wall to a pressure source and spring means bearing at one end on the housing and at the other end on the movable wall such that said spring means is biased against said pressure source to hold said movable wall immobile so long as said pressure source is communicated to said inlet of said housing, said movable wall being operatively connected to said force transmitting rod by a tubular member affixed to said movable wall; and
   a latching means arranged to hold said tubular member, said latching means including a pressure responsive element and means to communicate same to said power brake control means so that said latching means holds said tubular member until said power brake control means is operated by the vehicle operator.

2. In a brake system a means to automatically increase fluid displacement as is normally attended with pumping of a brake pedal by a vehicle operator, which means comprises:
   a power brake means;
   a master cylinder operatively connected to the brake pedal, said master cylinder having a hydraulic fluid reservoir;
   a fluid pressure intensifying means including a housing affixed to said power brake means and having a bore therein within which a piston is operatively arranged to divide said bore into a first variable volume chamber and a second variable volume chamber, which housing is provided with a discharge port for said first variable volume chamber and a valve port and an inlet port for said second variable volume chamber;
   conduit means including a first conduit for connecting said discharge port to said brake system, a second conduit connecting said master cylinder to said inlet port, and a third conduit connecting said valve port to said hydraulic fluid reservoir;
   a force transmitting rod within said power brake means and projecting therefrom into said housing to be operatively connected with said piston;
   a fluid pressure servometer having a housing affixed to said power brake means and within which a movable wall is reciprocably mounted, said housing having a fluid inlet communicating one side of the movable wall to a pressure source and spring means bearing at one end on the housing and at the other end on the movable wall such that said spring means is biased against said pressure source to hold said movable wall immobile so long as said pressure source is communicated to said inlet of said housing, said movable wall being operatively connected to said force transmitting rod by a tubular member projecting from said housing into said power brake means which tubular member is affixed to said movable wall; and a latching means arranged to hold said tubular member, said latching means including a pressure responsive element which is normally biased by a spring to engage said tubular member and which is communicated by a fourth conduit to said second conduit communicated to said master cylinder so that upon the operation of said master cylinder hydraulic pressure opposes said spring of said pressure responsive element to unlatch said tubular member.

3. In a brake system a means to automatically increase fluid displacement as is normally attended with pumping of a brake pedal by a vehicle operator, which means comprises:

a power brake control means operatively connected to the brake pedal;

a hydraulic fluid reservoir in communication with said power brake control means;

a fluid pressure intensifying means including a housing having a bore therein within which a piston is operatively arranged to divide said bore into a first variable volume chamber and a second variable volume chamber, which housing is provided with a discharge port for said first variable volume chamber and a valve port and an inlet port for said second variable volume chamber;

conduit means including a first conduit connecting said discharge port to the brake system, a second conduit connecting said power brake control means to said inlet port, and a third conduit connecting said valve port to said hydraulic fluid reservoir;

a force transmitting rod operatively connected to said piston;

a fluid pressure servomotor having a housing with a movable wall therein, said housing having a fluid inlet communicating one side of the movable wall to a pressure source and spring means bearing at one end on the housing and at the other end on the movable wall such that said spring means is biased against said pressure source to hold said movable wall immobile so long as said pressure source is communicated to said inlet of said housing, said movable wall being operatively connected to said force transmitting rod by a tubular member affixed to said movable wall, said tubular member having a recessed portion and a rearwardly facing inclined ramp;

a pawl mechanism including a spring biased piston urging a pin having the end opposite the piston beveled forwardly to a similar angle as said ramp into said recess; and a chamber for said pawl mechanism having an inlet port entering said chamber on a side of said piston opposite that upon which inlet port is communicated to said second conduit so that when a pressurized fluid from said power brake control means enters said port of a greater magnitude than the force of said spring, said pin will be removed from said recess to free said movable wall and upon the curtailment of said pressurized fluid entering said inlet port the spring will once again project said pawl mechanism to engage said ramp upon the return of said tubular member and thereafter extend into said recess to hold said tubular member and said movable wall.

4. In a brake system a means to automatically increase fluid displacement as is normally attended with pumping of a brake pedal by a vehicle operator, which means comprises:

a power brake control means operatively connected to the brake pedal, said power brake control means including a means to pressurize a hydraulic fluid and maintain a predetermined pressure;

a hydraulic fluid reservoir in communication with said power brake control means;

a fluid pressure intensifying means including a housing having a bore therein within which a piston is operatively arranged to divide said bore into a first variable volume chamber and a second variable volume chamber, which housing is provided with a discharge port for said first variable volume chamber and a valve port and an inlet for said second variable volume chamber;

conduit means including a first conduit connecting said discharge port to the brake system, a second conduit connecting the inlet port to said power brake control means and a third conduit connecting said valve port to said hydraulic fluid reservoir;

a force transmitting rod operatively connected to said piston;

a fluid pressure servomotor having a housing with a movable wall therein, said housing having a hydraulic fluid inlet which is communicated by a fourth conduit to said means for developing a pressure for said power brake control means such that said pressure impinges on said movable wall on one side thereof, and a spring means bearing at one end on the housing and at the other end on the movable wall opposite the side thereof on which the hydraulic fluid pressure is impinging such that said spring means is biased against said pressure source to hold said movable wall immobile so long as said pressure source is communicated to said inlet of said housing as scheduled by said power brake control means, said movable wall being operatively connected to said force transmitting rod by a tubular member affixed to said movable wall which tubular member has a rearward projection formed adjacent the end spaced from the movable wall with a recess; and a latching means operatively connecting said projection of the tubular member to said servomotor housing, said latching means including a pressure responsive element and means to communicate same to said power brake control means so that said latching means holds said tubular member until said power brake control means is operated by the vehicle operator.

References Cited by the Examiner

UNITED STATES PATENTS

| | | | |
|---|---|---|---|
| 2,065,176 | 12/36 | Engel | 60—54.5 X |
| 2,139,185 | 12/38 | Engel | 91—44 X |
| 2,305,302 | 12/42 | Mazur | 60—54.6 X |
| 2,787,122 | 4/57 | Price et al. | 60—54.5 |

JULIUS E. WEST, *Primary Examiner.*

ROBERT R. BUNEVICH, *Examiner.*

UNITED STATES PATENT OFFICE
CERTIFICATE OF CORRECTION

Patent No. 3,195,309                                          July 20, 1965

Maxwell L. Cripe

It is hereby certified that error appears in the above numbered patent requiring correction and that the said Letters Patent should read as corrected below.

Column 4, lines 21 and 65, for "servometer", each occurrence, read -- servomotor --; line 31, for "affxed" read -- affixed --.

Signed and sealed this 8th day of March 1966.

(SEAL)
Attest:

ERNEST W. SWIDER
Attesting Officer

EDWARD J. BRENNER
Commissioner of Patents